(12) United States Patent
Lafitte et al.

(10) Patent No.: US 12,384,952 B2
(45) Date of Patent: Aug. 12, 2025

(54) COMPOSITE CEMENT COMPOSITIONS AND METHODS OF CEMENTING AND/OR TREATING WELLS DRILLED WITH WATER-BASED DRILLING FLUIDS

(71) Applicant: Schlumberger Technology Corporation, Sugar Land, TX (US)

(72) Inventors: Valerie Gisele Helene Lafitte, Sugar Land, TX (US); Dean Michael Willberg, Houston, TX (US); Anatoly Medvedev, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/663,989

(22) Filed: May 18, 2022

(65) Prior Publication Data

US 2023/0374366 A1 Nov. 23, 2023

(51) Int. Cl.
*C09K 8/467* (2006.01)
*C04B 24/26* (2006.01)
(Continued)

(52) U.S. Cl.
CPC .......... *C09K 8/467* (2013.01); *C04B 24/2641* (2013.01); *C04B 28/02* (2013.01);
(Continued)

(58) Field of Classification Search
CPC ..... C09K 8/467; C04B 24/2641; C04B 28/02; C04B 2103/0049; C04B 2103/0051; C04B 2111/00146; E21B 33/14
See application file for complete search history.

(56) References Cited

U.S. PATENT DOCUMENTS

| 4,590,227 A | 5/1986 | Nakamura |
| 5,736,594 A | 4/1998 | Boles |

(Continued)

FOREIGN PATENT DOCUMENTS

| CN | 108026338 A | 5/2018 |
| JP | 2006118130 A | 5/2006 |

(Continued)

OTHER PUBLICATIONS

Search Report and Written Opinion of International Patent Application No. PCT/US2023/036121 dated Feb. 23, 2024, 9 pages.
(Continued)

*Primary Examiner* — Crystal J Lee
(74) *Attorney, Agent, or Firm* — Jeffrey D. Frantz

(57) ABSTRACT

Composite cement compositions and slurries for treating a well following a water-based wellbore operation are provided and comprise cement comprising at least one of cement particles and cementitious material, water, and water swellable particulates that are embedded in the cement, derived from an elastomeric material, and present at a concentration of at least about 2% by weight of the cement but no more than about 30% by weight of the cement. Methods for treating a well drilled with a water-based drilling mud are provided and comprise pumping the composite cement compositions and slurries into the well and treating the well by allowing the composite cement compositions and slurries to set or cure after being pumped into the well.

19 Claims, 4 Drawing Sheets

(51) Int. Cl.
  *C04B 28/02* (2006.01)
  *C04B 103/00* (2006.01)
  *C04B 111/00* (2006.01)
  *E21B 33/14* (2006.01)

(52) U.S. Cl.
  CPC ...... *E21B 33/14* (2013.01); *C04B 2103/0049* (2013.01); *C04B 2103/0051* (2013.01); *C04B 2111/00146* (2013.01)

(56) References Cited

U.S. PATENT DOCUMENTS

| | | |
|---|---|---|
| 6,907,929 B2 | 6/2005 | Leroy-Delage |
| 7,138,446 B2 | 11/2006 | Reddy |
| 7,402,204 B2 | 7/2008 | Le Roy-Delage |
| 7,612,817 B2 | 11/2009 | Tay |
| 7,645,817 B2 | 1/2010 | Reddy |
| 7,717,180 B2 | 5/2010 | Badalamenti |
| 8,486,868 B2 | 7/2013 | Brenneis |
| 8,551,244 B2 | 10/2013 | Le Roy-Delage et al. |
| 9,222,011 B2 | 12/2015 | Le Roy-Delage et al. |
| 9,683,161 B2 | 6/2017 | Le Roy-Delage et al. |
| 10,557,341 B2 | 2/2020 | Kolchanov |
| 11,267,760 B2 | 3/2022 | Lehmann |
| 2002/0017224 A1 | 2/2002 | Horton |
| 2005/0058817 A1 | 3/2005 | Famy et al. |
| 2006/0174802 A1 | 8/2006 | Bedel et al. |
| 2006/0258546 A1 | 11/2006 | Brannon |
| 2008/0108524 A1* | 5/2008 | Willberg ............... C09K 8/035 507/224 |
| 2012/0024196 A1 | 2/2012 | Gong |
| 2012/0152153 A1 | 6/2012 | Gong |
| 2012/0175134 A1 | 7/2012 | Robisson |
| 2016/0032169 A1 | 2/2016 | Chew et al. |
| 2016/0244655 A1 | 8/2016 | Reddy |
| 2016/0289531 A1 | 10/2016 | Agapiou |
| 2017/0015824 A1* | 1/2017 | Gozalo ............... C08L 33/18 |
| 2017/0334779 A1 | 11/2017 | Gong |
| 2018/0100095 A1* | 4/2018 | Reddy ............... C04B 24/383 |
| 2018/0148628 A1 | 5/2018 | Vlasopoulos et al. |
| 2018/0230358 A1 | 8/2018 | Jain |
| 2018/0244572 A1 | 8/2018 | Ranjbar |
| 2020/0010363 A1 | 1/2020 | Thomas et al. |
| 2020/0247717 A1 | 8/2020 | Atakan et al. |
| 2022/0340488 A1 | 10/2022 | Bullerjahn et al. |
| 2023/0126439 A1 | 4/2023 | Pisklak |
| 2023/0138857 A1 | 5/2023 | Singh |

FOREIGN PATENT DOCUMENTS

| | | |
|---|---|---|
| WO | 2005040550 A1 | 5/2005 |
| WO | 2017087163 A1 | 5/2017 |
| WO | 2022122848 A1 | 6/2022 |

OTHER PUBLICATIONS

Office Action issued in U.S. Appl. No. 18/073,650 dated Feb. 26, 2024, 10 pages.
Search Report and Written Opinion of International Patent Application No. PCT/US2023/022723 dated Sep. 8, 2023, 9 pages.
Search Report and Written Opinion of International Patent Application No. PCT/US2023/023080 dated Sep. 8, 2023, 10 pages.

* cited by examiner

COMPOSITE CEMENT COMPOSITIONS AND METHODS OF CEMENTING AND/OR TREATING WELLS DRILLED WITH WATER-BASED DRILLING FLUIDS

FIELD OF THE DISCLOSURE

The present disclosure relates to composite cement compositions or slurries for treating wells drilled with water-based drilling fluids and methods of cementing and/or treating the wells with the composite cement compositions or slurries, wherein the wells may be oil wells, gas wells, geothermal wells, steam-injection wells, or the like. The composite cement compositions or slurries and methods disclosed herein are suitable for cementing and/or treating one or more zones of the wells drilled with water-based drilling fluids.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, at least one pumpable composite cement slurry may comprise cement comprising at least one of cement particles and cementitious material, water, and water swellable particulates that are embedded in the cement and derived from an elastomeric material.

In an embodiment, the elastomeric material of the water swellable particulates may be doped with superabsorbent moieties to confer water absorbing properties to the water swellable particulates.

In an embodiment, superabsorbent moieties may be present within the elastomeric material such that water swelling of the water swellable particulates is limited or prevented during a time duration after the cement, water, and water swellable particulates are mixed together.

In an embodiment, the time duration may be at least about 2 hours and no more than about 4 hours.

In an embodiment, the water swellable particulates may have a delay swelling mechanism provided by the elastomeric material that comprises at least one superabsorbent component.

In an embodiment, at least one superabsorbent component may interactable with water via the delay swelling mechanism of the water swellable particles.

In an embodiment, a delay swelling mechanism may be indictive of a negative charge repulsion attached to at least one functional group associated with the elastomeric material.

In an embodiment, the at least one functional group may comprise at least one acrylate group.

In an embodiment, an amount of the elastomeric material in the slurry may be at least about 2% by weight of the cement and no more than about 30% by weight of the cement.

In an embodiment, an amount of the elastomeric material in the slurry may be at least about 4% by weight of the cement and no more than about 10% by weight of the cement.

In one or more embodiments, a method of treating a well drilled with a water-based drilling mud is provided, wherein the method may pump the slurry disclosed herein into at least one zone of the well following a water-based wellbore operation.

In an embodiment, the method may treat the at least one zone of the well by allowing the slurry to set and/or cure after the slurry was pumped into the at least one zone.

In an embodiment, the method may drill the at least one zone of the well with the water-based drilling mud before pumping the slurry into the at least one zone.

In an embodiment, the method may at least partially fill a space between an outside of a metal casing disposed within the well and a borehole wall of the well with the slurry pumped into the at least one zone of the well.

In one or more embodiments, a method of treating a well is provided, wherein the method may mix water with a cement and water swellable particulates derived from an elastomeric material to form a composite cement composition and/or pump the composite cement composition into at least one zone of the well following a water-based wellbore operation, wherein an amount of the elastomeric material in the composite cement composition is at least about 2% by weight of the cement and no more than about 30% by weight of the cement.

In an embodiment, the method may treat the at least one zone of the well by allowing the composite cement composition to set and/or cure after being pumped into the at least one zone.

In an embodiment, the method may drill the at least one zone of the well with a water-based drilling mud before pumping the composite cement composition into the at least one zone.

In an embodiment, the amount of the elastomeric material in the slurry may be at least about 4% by weight of the cement and no more than about 10% by weight of the cement.

In an embodiment, the elastomeric material of the method may be doped with superabsorbent moieties to confer water absorbing properties to the water swellable particulates.

In an embodiment, the method may isolate two zones of the well from each other by allowing the composite cement composition to set and/or cure after being pumped into the at least one zone of the well.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
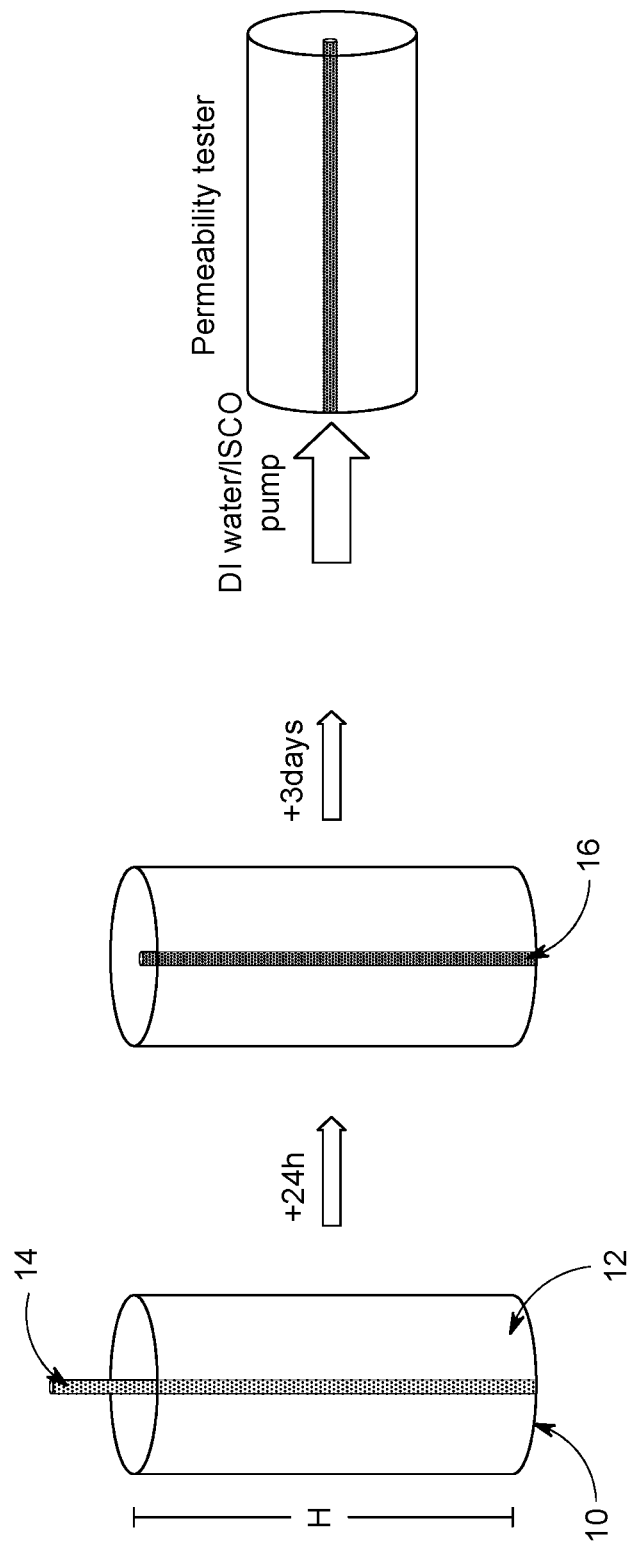
FIG. 1 is a schematic of an experimental testing system, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Where a numerical limit or range is stated, the endpoints are or may be included. Also, all values and subranges within a numerical limit or range are specifically included as if explicitly written out.

As used herein, the phrases "selected from the group consisting of," "chosen from," and the like include mixtures of the specified materials. Tunis such as "contains", and the like are meant to include "including at least" unless otherwise specifically noted.

In one or more embodiments, the composite cement formulations and/or compositions (collectively referred to hereinafter as "the cement compositions" or "the cement composition") disclosed herein are suitable and usable for cementing and/or treating at least one borehole, wellbore, and/or well (hereinafter "the well") drilled with at least one water-based drilling fluids and/or water-based drilling mud (collectively referred to hereinafter as "the water-based mud"). In some embodiments, the well is at least one oil well, at least one gas well, at least one geothermal well, at least one steam-injection well, or one or more similar wells. The cement composition may comprise one or more cement particles and/or at least one cementitious material (collectively referred to hereinafter as "the cement"), water, one or more water swellable particulates and/or particles (collectively referred to hereinafter as "the swellable particles"), and/or one or more optional cement additives (hereinafter "the optional additives"). The present disclosure should not be deemed as limited to a specific embodiment or type of well that was drilled with the water-based mud.

The methods disclosed herein utilize the cement compositions disclosed herein for cementing and/or treating the well drilled with the water-based mud. When completing the well, metal casing is installed inside the well after the well has been drilled, and space between an outside of the metal casing and a borehole wall of the well is filled, or at least partially filled, with the cement composition disclosed herein to provide physical stability and isolation of one or more fluid-containing zones (hereinafter "the one or more zones") through which the well may pass. Over the life of the well, the cement composition may be exposed to changing stresses. Some of these changes, such as those caused by pressure testing of the metal casing or temperature increases due to steam injection, may be sufficient to cause the cement composition to crack or become damaged, which may lead to loss of zonal isolation of the one or more zones. The cement compositions disclosed herein are suitable for filling or at least partially filling the space while reducing or preventing crack formation within and damage to the cement compositions. Moreover, the cement compositions and methods disclosed herein are suitable for cementing and/or treating the one or more zones of the well while maintaining or substantially maintaining zonal isolation between the one or more zones of the well.

Water-Based Mud

In one or more embodiments, the water-based mud disclosed herein may be or may comprises at least one wellbore fluid and/or at least one drilling fluid (collectively referred to hereinafter as "the at least one drilling fluid") having a major liquid phase comprising water or saltwater and at least one wetting external phase. The water-based mud may comprise at least one selected from freshwater, seawater, lime, potassium, silicate, or a combination thereof. In some embodiments, the water-based mud may contain a brine, such as, for example, seawater, aqueous base fluids, or solutions wherein the salt concentration is less than that of sea water, or aqueous fluids or solutions wherein the salt concentration is greater than that of sea water. Salts that may be found in seawater include, but are not limited to, sodium, calcium, aluminum, magnesium, potassium, strontium, lithium, and salts of chlorides, bromides, carbonates, iodides, chlorates, bromates, formates, nitrates, oxides, sulfates, phosphates, silicates and fluorides. Salts that may be incorporated into given brines include any one or more of those present in natural seawater or any other organic or inorganic dissolved salts. Additionally, brines that may be used in the water-based mud disclosed herein may be natural or synthetic, with synthetic brines tending to be much simpler in constitution. One of ordinary skill would appreciate that the above salts may be present in the base fluids or may be added according to methods known in the art. Further, the amount of the aqueous based continuous phase should be sufficient to form the water-based mud. This amount may range from nearly 100% of the water-based mud to less than about 30% of the water-based mud by volume. In some embodiments, the aqueous based continuous phase may constitute from about 95 to about 30% by volume or from about 90 to about 40% by volume of the water-based mud.

In some embodiments, the water-based mud disclosed herein may be a high-performance water-based mud comprising the inhibition agents as inhibitor of reactive shale swelling. Prevention of shale swelling is key to the water-based mud performance because wellbore integrity depends on inhibitive properties of WBM. Additionally, prevention of shale swelling and consequent reduction in shale dispersion reduces costs associate with the wellbore drilling processes by reducing the volumes of dilution needed to maintain acceptable viscosities for the water-based mud. The water-based mud disclosed herein may have pH values of less than about 11.5, about 8.5 to about 11, about 9.0 to about 10.5, or about 9.5 to about 10.5.

In yet another embodiment, the water-based mud disclosed herein may be used alone or in combination with one or more conventional or additional additives. The additional additives, that may further be included in the present water-based mud, may include, for example, wetting agents, organophilic clays, additional viscosifiers, fluid loss control agents, surfactants, dispersants, interfacial tension reducers, pH buffers, mutual solvents, additional thinners, additional thinning agents, cleaning agents, or at least one mixture thereof. Inclusion of such additional additives in the present water-based mud should be well known to one of ordinary skill in the art of formulating water-based wellbore fluids or water-based muds.

In one or more embodiments, the water-based mud disclosed herein may be used in or suitable with one or more wellbore operations and/or methods which may include drilling at least one wellbore (i.e., the well) into subterranean formations in a manner similar to those wherein conventional water-based wellbore fluids are used. The water-based mud may be circulated through the drill pipe, through the bit, and up the annular space between the pipe and the formation or the metal casing to the surface. The water-based mud disclosed herein may perform several different functions during the wellbore operations and/or drilling methods, such as, for example, cooling the bit, removing drilled cuttings from the bottom of the hole, suspending, coating, and/or encapsulating the cuttings, coating walls of the wellbore, and/or weighting the material within the wellbore when circulation is interrupted.

Cement Compositions

In one or more embodiments, the cement compositions disclosed herein for treating the well or at least one zone of the well may be water-based cement slurries and/or may comprise or consist of the cement, water, the swellable particles, the optional additives, or a combination thereof. The cement composition disclosed herein may be mixed on site for use, or may be provided in pre-mixed blends of solid materials to which water and/or other liquid components may be added prior to pumping, introducing, and/or disposing the cement composition into the well. After the cement, the swellable particles, and the optional additives are mixed together with sufficient water, the cement composition forms as a pumpable cement slurry that may be pumped, disposed, or introduced into the well and allowed to set or cure for a set time in at least one zone of the one or more zones of the well. The cement, the swellable particles, and the optional additives may be added to the water on location at a well-site of the well where it is to be used, or may be carried out at other locations than the well-site of the well. If the well-site location is selected for carrying out this mixing/formulating step, the cement, the swellable particles, and the optional additives may be dispersed into the water and sufficiently mixed together to form the cement composition disclosed herein, and the formed cement composition may be emplaced, disposed, and/or circulated in the well or the at least one zone of the well using one or more techniques known in the art. In some embodiments, the cement compositions disclosed herein may have a density of about 16 pounds per gallon (hereinafter "ppg") or less, about 15.5 ppg or less, about 15 ppg or less, about 14.5 ppg or less, or about 14 ppg or less.

Cement

In one or more embodiments, the cement disclosed herein comprises cement material for permanently sealing an annular space or at least a portion of the annular space between the metal casing and the borehole wall of the well. The cement material may comprise one or more cement particles and/or at least one cementitious material, such as, for example, Portland cement, limestone, clay, fly ash, bottom ash, cement kiln dust, blast furnace slag, other cement-like materials, chemical additives, or at least one combination thereof. In some embodiments, the cement compositions disclosed herein may be or may comprise at least one controlled particle size cement formulation comprising one or more fine particles, one or more medium particles having first sizes, one or more large particles having second sizes, or a combination thereof. In an embodiment, the one or more medium particles may comprise the cement material, the one or more large particles may comprise the swellable particles, and the first sizes may be less than or equal to the second sizes.

Water

In one or more embodiments, water utilized in the cement compositions disclosed herein may be a low mineral water, such as, for example, tap water. In some embodiments, other water, such as, for example, brine or salt water may be optionally used or used in combination with the low mineral water. Further, the cement compositions disclosed herein may have a water content of about 65% by volume or less, about 60% by volume or less, about 55% by volume or less, about 50% by volume or less, or about 45% by volume or less.

Swellable Particles

The swellable particles may interact with water present in the water-based mud and/or may change one or more fluid properties of the water-based mud. The swellable particles may comprise or may have or exhibit a delay swelling mechanism. In some embodiments, the swellable particles are based on one or more elastomers and/or the one or more elastomers may contain or comprise an amount of one or more superabsorbent components. The amount of the one or more superabsorbent components is sufficient to interact with the water-based mud such that the cement compositions for treating the well may also comprise or may have or exhibit the delay swelling mechanism. The swellable particles have a slow reaction and/or a slow reaction time with water present in the water-based mud. As a result, the swellable particles may only react with the water when the cement compositions are thickening and not during hydration of the cement compositions, and the delay swelling mechanisms of the cement compositions disclosed may be achievable as a result of the slow reaction and/or the slow reaction time with the water.

In some embodiments, the one or more elastomers may swell with water due to or as a result of the presence of the one or more superabsorbent components within chemical structures or features of the one or more elastomers. The swelling of the one or more elastomers may happen and/or occur slowly over a time duration, such as, for example, over one or more hours or one or more days. The time duration associated with the swelling of the one or more elastomers may be necessary and/or suitable for placing the cement compositions disclosed herein on time at a specific location, position, or zone within the well. In some embodiments, the cement compositions disclosed herein may contain or comprise a large amount of water; however, the swelling reaction (s) of the one or more elastomers may not occur during mixing of the cement compositions or while pumping or during a pumping time associated with placement of the cement compositions within the well. If swelling of the one or more elastomers occurs during the mixing and/or the pumping of the cement compositions, the swelling would be detrimental for the cement placement of the cement composition as the one or more fluid properties of the cement compositions would change during/after the mixing and/or the pumping time of the cement compositions.

In one or more embodiments, the one or more superabsorbent components may absorb a large quantity of water in a short period of time; however, the delay swelling mechanism may limit swelling of the swellable particles during the mixing and/or the pumping of the cement compositions. The delay swelling mechanism of the one or more superabsorbent components may rely upon or be a result of at least one negative charge repulsion attached to at least one polymer or functional group of the one or more elastomers or associated with the one or more elastomers. In some embodiments, the at least one polymer or functional group may be, comprise, or consist of one or more acrylate-based groups. An amount of the at least one negative charge repulsion may dictate, control, and/or be indicative of swelling abilities of the one or more superabsorbent components or the delay swelling mechanism of the cement compositions disclosed herein. When salts are present in the water, the swelling abilities and/or the delay swelling mechanism may be based upon or achievable by the at least one negative charge repulsion, wherein counter ions may shelter or at least partially shelter the charge(s) and/or may reduce the repulsion(s).

In some embodiments, the swellable particles and/or the one or more elastomers disclosed herein may contain or comprise at least one superabsorbent polymer (hereinafter "the SAP"), and the SAP may be present in the cement compositions at sufficient and/or suitable amounts for the swellable particles and the one or more elastomers to absorb water at a controlled rate based upon the delay swelling mechanism. Without the SAP present at the sufficient and/or suitable amounts in the cement compositions disclosed herein, the cement compositions, the swellable particles, and/or the one or more elastomers may be hydrophobic and/or absorb oil substances. For example, the one or more elastomers may be doped with an amount of one or more superabsorbent moieties such that the one or more elastomers may have and/or exhibit controlled, or controllable water-absorbing properties based on the delay swelling mechanism. The amount of superabsorbent moieties present is sufficient to limit or substantially limit swelling of the swellable particles for a duration of time such that the cement compositions comprising the superabsorbent moieties may be mixed and pumped into the well without swelling or substantial swelling thereof. In embodiments, the duration of time associated with the limited, or substantially limited, swelling of the swellable particles may be at least about 30 minutes but no more than about 6 hours, at least about 1 hour but no more than about 5 hours, at least about 2 hours but no more than about 4 hours, or at least about 2.5 hours but no more than about 3.5 hours.

In one or more embodiments, the swellable particles may be added to the cement compositions disclosed herein at a concentration ranging from about 0.1% by weight of cement (hereinafter "BWOC") to about 40% BWOC, from about 0.5% BWOC to about 35% BWOC, from about 1% BWOC to about 30% BWOC, from about 2% BWOC to about 25% BWOC, from about 2.5% BWOC to about 25% BWOC, from about 3% BWOC to about 20% BWOC, or from about 4% BWOC to 10% BWOC. In some embodiments, the swellable particles disclosed herein may be pretreated or physically manipulated or altered prior to being incorporated into the cement compositions. For example, a pretreatment of the swellable particles may comprise grinding and/or milling the swellable particles prior to incorporation into the cement compositions. As a result of the pretreatment, particle sizes of the swellable particles may be homogenized or substantially homogenized prior to incorporation into the cement compositions. In an embodiment, the pretreatment may comprise cryogenic grinding, cryogenic milling, and/or lab grinding the swellable particles prior to incorporation into the cement compositions.

In at least one embodiment, the swellable particles disclosed herein may be, comprise, or consist of inorganic material dispersed within a polymer matrix, wherein the inorganic material is swellable upon contact with water due to hydration and phase modification of the inorganic material. For example, the present swellable particles may be, comprise, or consist of at least one composition comprising an inorganic material and a polymer in which the inorganic material is dispersed, wherein the inorganic material may promote swelling of the swellable particles disclosed herein. In some embodiments, the inorganic material, which may be a mineral filler capable of swelling on contact with water, is, comprises, or consists of a metal oxide, such as, for example, magnesium oxide, calcium oxide, or a mixture thereof. The polymer may be, comprise, or consist of at least one thermoset material, at least one thermoplastic material, or a mixture thereof. In an embodiment, the polymer may comprise at least one polymer matrix selected from the group consisting of polyetheretherketone, polyaryletherketones, polyamides (Nylon 6, Nylon 6,6, Nylon 6,12, Nylon 6,9, Nylon 12, Nylon 11), polycarbonate, polystyrene, polyphenylsulphone, polyphenylene sulphide, polysulphone, polytetrafluoroethylene, polypropylene, epoxy resins, furan resins, acrylonitrile-butadiene rubber, hydrogenated acrylonitrile-butadiene rubber, ethylene propylene diene M-class rubber, and at least one mixture thereof. In some embodiments, the polymer may be selected from the group consisting of polyetheretherketone, polyphenylsulphone, polyphenylene sulphide, polysulphone, polypropylene, acrylonitrile-butadiene rubber, hydrogenated acrylonitrile-butadiene rubber, ethylene propylenediene M-class rubber, and at least one mixture thereof. In yet another embodiment, the polymer is at least one of polyetheretherketone, polyphenylsulphone, polyphenylene sulphide, polysulphone, polypropylene, and at least one mixture thereof. In still another embodiment, the polymer may be, comprise, or consist of at least one thermoplastic having at least a glass transition temperature or a melting point above about 150° C. For example, the polymer may be, comprise, or consist of PEEK, polypropylene, or at least one mixture thereof. A glass transition temperature or a melting point for the polymer that is below about 150° C. may be less preferred but may be suitable for downhole operations at low temperature(s). In an embodiment, the polymer may be, comprise, or consist of thermoplastic polymers selected from polyethylene, polyvinylchloride, or at least one mixture thereof.

In some embodiments, the swellable particles disclosed herein may not swell after coming into contact with either aqueous or non-aqueous fluids or the polymer swells after coming into contact with either aqueous or non-aqueous fluids. For example, the swellable particles disclosed herein may be capable of swelling after coming into contact with one or more triggers which may cause one or more components of the swellable particles to swell, and may be capable of swelling at temperatures even over about 300° C. In an embodiment, the swellable particles may be formed after inorganic and organic parts are blended together using for example the extrusion method or batch processing or continuous stirred tank reactors. The blending conditions may be adjusted to produce the appropriate dispersion of the inorganic material within the polymer matrix. The inorganic mineral filler may be optionally surface-treated prior to blending with the polymer to improve bonding to and dispersion within the polymer matrix. Within the context of the present disclosure, "surface-treated" may be understood that the inorganic material filler is submitted to a chemical or physical treatment using a treating agent such as for example silane coupling agents, high fatty acids, metal salts of fatty acids, unsaturated organic acids, organic titanates, resin acids or polyethylene glycol.

In at least one embodiment, the swellable particles disclosed herein may be, comprise, or consist of one or more swellable elastomers which may be less affected by fluctuations in brine concentration. The one or more swellable elastomers may be natural rubber and/or synthetic elastomers mixed or compounded with particles of a polymer. In some embodiments, the polymer particles may be drawn from a betaine group prepared by inverse emulsion polymerization and one or more additional fillers, vulcanizing agents, and other additive substances may be incorporated into the one or more swellable elastomers. In other embodiments, the elastomer backbone of the swellable particles may be tailored with particular concentrations of cations and/or anions grafted thereto so as to reduce the sensitivity thereof to brine concentration. An elastomer base material for the swellable particles may also include non-elastomeric polymers and be constructed in a variety of configurations. For example, the one or more swellable elastomers may include fillers, plasticizers, accelerants, various fibers, or a combination thereof. Additionally, non-elastomeric polymer may be at least one selected from one or more thermoplastic polymers, such as, for example, polyolefins, polyamides, polyesters, one or more thermoplastic polyurethanes and polyurea urethanes, copolymers, and blends thereof, and/or one or more thermoset polymers such as phenolic and epoxy resins.

In at least one embodiment, the swellable particles disclosed herein may be, comprise, or consist of one or more superabsorbent polymers (hereinafter "SAP"), one or more hydrogels, or at least one combination thereof. For example, the present swellable particles may be, comprise, or incorporate hydrophilic, swelling polymers, such as, for example, at least one cationic polymer, at least one anionic polymer, or at least one zwitterionic polymer in an elastomeric matrix. Non-limiting examples may include polyacrylic acid, polymethacrylic acid, polyacrylamide, polyethyleneoxide, polyethylene glycol, polypropylene oxide, poly (acrylic acid-co-acrylamide), polymers made from zwitterionic monomers which may include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, [(2-acryloylethyl)dimethylammonio] methyl phosphonic acid, 2-(acryloyloxyethyl)-2'-(trimethylammonium)ethyl phosphate, 2-methacryloyloxyethyl phosphorylcholine, 2-[(3-acrylamidopropyl)dimethylammonio]ethyl 2'-isopropyl phosphate, 1-vinyl-3-(3-sulfopropyl)imidazolium hydroxide, (2-acryloxyethyl)carboxymethyl methylsulfonium chloride, 1-(3-sulfopropyl)-2-vinylpyridinium betaine, N-(4-sulfobutyl)-N-methyl-N,N-diallylamine ammonium betaine, N,N-diallyl-N-methyl-N-(2-sulfoethyl)ammonium betaine, or at least one combination thereof. In some embodiments, the SAP may be, comprise, or consisting of one or more hydrophilic networks which may absorb and/or retain large amounts of water or aqueous fluids or solutions. SAP materials may exhibit fast kinetics of swelling which may be useful for downhole applications, such as, for example, sealing applications. Further, a large amount of SAP fillers may be required (about 30% to about 40% by weight) to achieve swelling which may result in a significant strength reduction upon swelling.

In at least one embodiment, the cement composition(s) or swellable particles disclosed herein may comprise elastomeric material compounded with reactive fillers and SAP. The SAP may absorb a large quantity of water wherein the absorbed water may then be available to the reactive fillers, thereby increasing the reaction rate and the swelling rate of the reactive fillers. The reactive fillers may provide both swelling and reinforcement to the material thus providing long term physical integrity. Further, the amount of SAP needed is reduced as the SAP functions mainly for initial water uptake and the reactive filler provides the swelling. The cement composition(s) or swellable particles disclosed herein that comprise elastomers and reactive fillers may have a slower rate of swelling when compared to oil swellable elastomers. To improve the efficiency of water transport SAP may be used. In an embodiment, rubber compositions containing SAP fillers may be utilized as described herein.

When the cement compositions disclosed herein come in contact with remaining water from the water-based mud which may be left in at least one water channel of the one or more zones after one or more water-based wellbore operations or methods, the swellable particles may swell via the water and change at least one fluid property of the at least one water channel. As a result, the at least one fluid property of the at least one water channel, such as, for example, pathway conductivity may change from a conductive pathway to a non-conductive pathway. In some embodiments, the swellable particles may be embedded in the cement compositions and swellable via the remaining water from the water-based wellbore operations or methods and/or the water-based mud.

Optional Additives

In one or more embodiments, the optional additives of the cement compositions disclosed herein may be or may comprise one or more dry cement additives and/or one or more liquid cement additives that are usable or suitable to control density, setting time, strength and flow properties and/or to reduce occurrence of annular gas flow. In some embodiments, the optional additives disclosed herein may comprise one or more suspension agents, one or more dispersing agents, one or more antifoam agents, one or more surfactants, one or more retarders, one or more expansion agents, one or more weighting agents, one or more cement setting accelerators, one or more fluid loss control agents, or at least one combination thereof.

Cementing/Treating Methods

In one or more embodiments, the methods disclosed herein may comprise mixing the cement, the swellable particles, the optional additives, and the water together to form the cement compositions disclosed herein, wherein the formed cement compositions are pumpable cement slurries. The methods disclosed herein may comprise pumping the cement compositions or pumpable cement slurries into the well and/or allowing the cement compositions or pumpable cement slurries to set for a set time or cure for a cure time within the well for cementing and/or treating the well. In some embodiments, the methods disclosed herein may comprise drilling the well with the water-based mud prior to cementing and/or treating the well with the pumped cement compositions or pumpable cement slurries. For example, the cement compositions or pumpable cement slurries may be pumped, disposed, or introduced into the well following a water-based wellbore operation or water-based drilling operation. Further, the methods disclosed herein may comprise dry blending the cement, the swellable particles, and the optional additives prior to mixing with the water to form the cement compositions or pumpable cement slurries. For example, solid materials used in or suitable for the cement compositions, such as, for example, the cement, the swellable particles, and the optional additives, may be provided in one or more pre-mixed blends to which water and/or other liquid component may be added prior to pumping or introducing the cement compositions into the well. After the cement compositions or pumpable cement slurries have been pumped into the well and the set or cure time has passed, lapsed, expired, or been completed, the resulting hardened or cured cement composition may provide physical stability and/or isolation of the one or more zones through which the well may pass.

In some embodiments, the methods disclosed cement and/or treat the well or at least one zone of the well with the cement composition or pumpable cement slurry disclosed herein. For example, the methods disclosed herein may comprising filling or at least partially filling the space between the outside of the metal casing and the borehole wall of the well with the cement composition or pumpable cement slurry disclosed herein to provide physical stability and isolation of the one or more zones through which the well may pass. As a result, the space may be filled, or at least partially filled, by the cement compositions or pumpable cement slurries disclosed herein, and at least one zone of the well may be cemented and/or treated by the cement compositions or pumpable cement slurries disclosed herein.

EXPERIMENTS

Test 1

FIG. 1 is a schematic of a permeability tester that illustrates an experimental testing method disclosed herein. The permeability tester comprises a tube 10 having a height H, a cement slurry 12, a wood dowel 14, and a water-based mud-filled channel 16.

Test 1 Method

For the experimental testing, a 14.5 ppg pumpable cement slurry containing 5% BWOC of elastomers disclosed herein was mixed and added to the tube 10 having a height H of five inches. The wood dowel 14 having a diameter of three millimeters was then inserted into the tube 10 and left for 24 hours. A water-based mud as disclosed herein was added to a channel remaining after removal of the wood dowel 14 and the tube 10 was left setting or curing for an additional three days prior to the water injection testing. As a result, plug-like behavior was observed. Water was injected at incremental flow rate from 20 milliliters/minute until maximum pressure was attained, wherein the pressure response is a function of the flow rates. The maximum pressure at plug release was recorded. A total of four samples were tested and the average of the maximum pressure was calculated for each type of additive.

Test 1 Results

Figure 2:
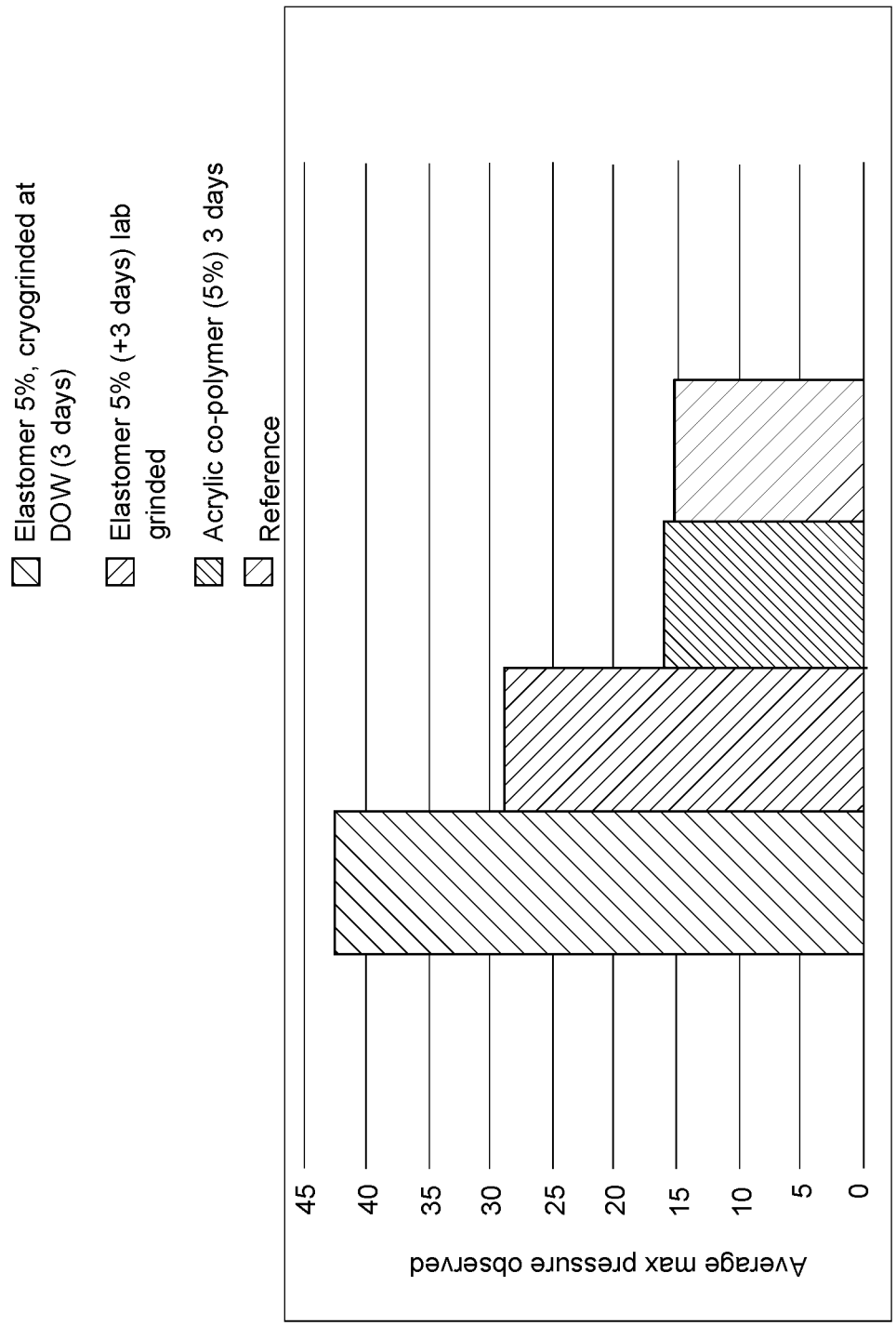
FIG. 2 is a graph illustrating test performances of two elastomers disclosed herein, a commercial acrylic copolymer material, and a reference cement, wherein the unit of pressure for the x-axis is pressure per square inch, according to one or more examples of the disclosure.

The experimental testing was performed with three different type of elastomers having varying compositions and swellability indexes. One commercially available elastomer, namely, DRYFLEX® 702 (commercially available from Dryvit™ located in Beachwood, OH) which is a high percentage acrylic co-polymer elastomer mixed with Portland cement did not show much improvement over the reference elastomer as shown in FIG. 2. However, inventive Elastomers 1 and 2 disclosed herein exhibited superior and unexpected results when directly compared to the results obtained for the commercially available elastomer and the reference elastomer as shown in FIG. 2.

Test 2

Swelling in different water salinities using a simple tea bag test was also performed and compared with a conventional superabsorbent (i.e., absorbent copolymer: POLYSWELL commercially available from M-I L.L.C. located in Houston, TX).

Test 2 Method

Water swelling efficiency was assessed using the tea bag method. Tea bags were purchased from Amazon.com and either 0.1 gram or 1 gram of SAP additives (i.e., the conventional superabsorbent or the elastomer disclosed herein) were added to the tea bag, and then the tea bag was immersed into the media. After a certain time, the tea bags were removed, and excess of water was gently dried on a paper towel. The weight of the wet tea bag was then recorded. Water absorption was calculated for 1 gram of SAP additive accounting the weight of an empty wet tea bag according to the following equation:

Absorption=(mass recorded after time $t$-(mass additive+mass empty wet bag))/mass additive)

Test 2 Results

Figure 3:
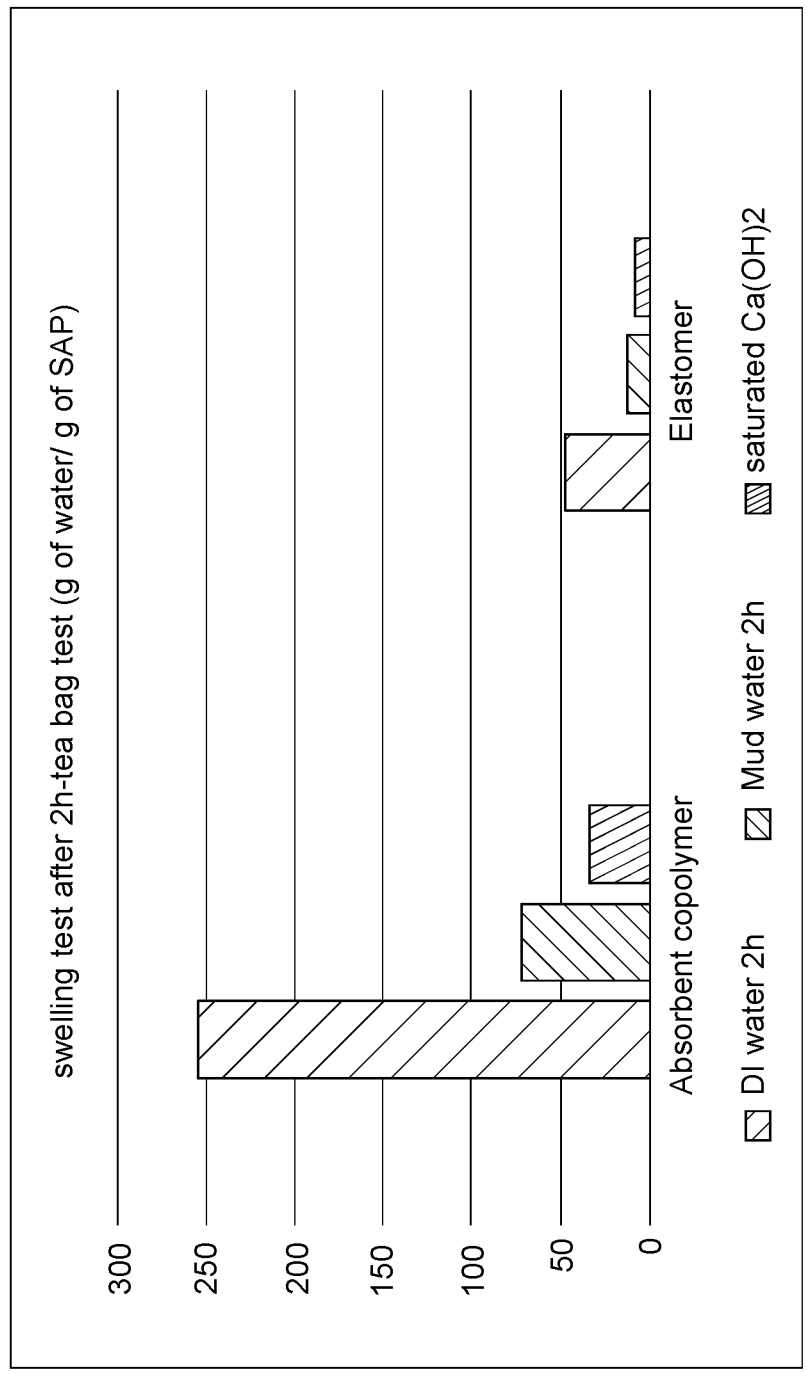
FIG. 3 is a graph illustrating swelling test performances of an elastomer disclosed herein and a commercial copolymer material, wherein the unit of measure for the y-axis is grams of water absorbed per gram of material used, according to one or more examples of the disclosure.

As expected, the novel Elastomer disclosed herein swelled less than the superabsorbent after 2 hours as shown in FIG. 3. The effect of salinity is almost less pronounced with the Elastomer disclosed herein. When applying this in the field, it is preferable to have an elastomer material that does not swell too fast during the first few hours of the pumping stage for the cement compositions disclosed herein.

Test 3

Effects on the rheological properties of the cement slurries were examined and determined.

Figure 4:
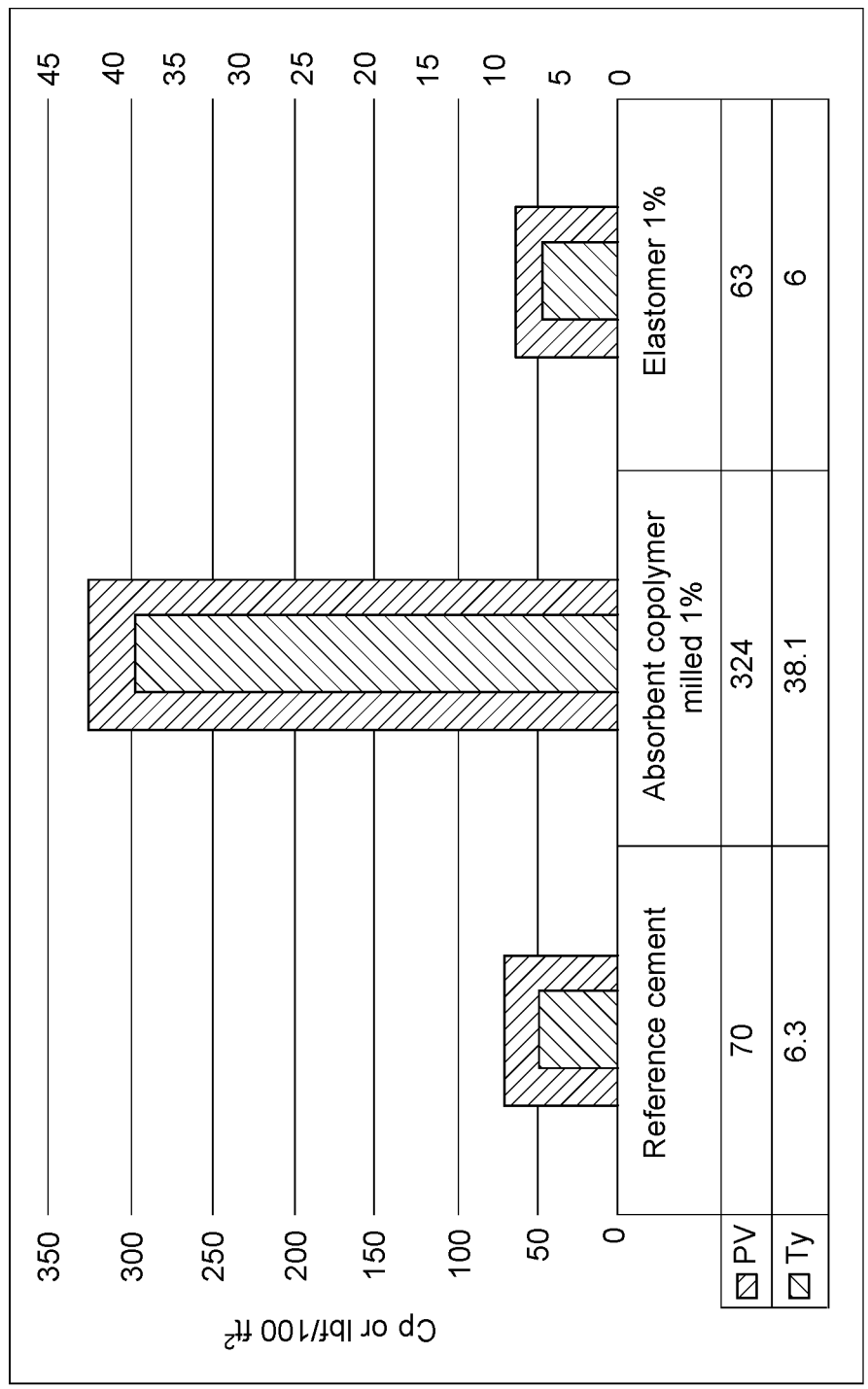
FIG. 4 is a graph illustrating cement slurry rheology impacts of an elastomer disclosed herein, a commercial copolymer material, and a reference cement, according to one or more examples of the disclosure.

FIG. 4 shows the impacts of the SAP additives utilized in Test 2 on the cement slurry rheology measured in Centipoise. A cement containing no additives serves as a reference for Test 3. The conventional superabsorbent (i.e., POLYSWELL) substantially altered the rheology slurry properties as observed by a significant increase in rheology. On the other side, the novel Elastomer disclosed herein did not show much impact on the slurry when directly compared to the reference cement; however, the novel Elastomer disclosed herein was unexpectedly capable of slowly absorbing water past the pumping stage.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed:

1. A composite cement slurry comprising:
cement comprising at least one of cement particles or cementitious material;
water; and
water swellable particulates that are embedded in the cement at a concentration ranging from 0.1% to 40% by weight of the cement, the water swellable particulates consisting of an elastomeric material doped with hydrophilic swellable polymer.

2. The composite cement slurry of claim 1, wherein the hydrophilic swellable polymer are present within the elastomeric material such that water swelling of the water swellable particulates is prevented during a time duration after the cement, the water, and the water swellable particulates are mixed together.

3. The composite cement slurry of claim 2, wherein the time duration is at least about 2 hours and no more than about 4 hours.

4. The composite cement slurry of claim 1, wherein the water swellable particulates have a delay swelling mechanism provided by the elastomeric material, the delay swelling mechanism configured to limit swelling of the water swellable particulates during at least one of mixing or pumping of the composite cement slurry.

5. The composite cement slurry of claim 4, wherein the delay swelling mechanism comprises a negative charge repulsion attached to at least one functional group associated with the elastomeric material.

6. The composite cement slurry of claim 5, wherein the at least one functional group associated with the elastomeric material comprises at least one acrylate group.

7. The composite cement slurry of claim 1, wherein an amount of the elastomeric material in the composite cement slurry is at least about 2% by weight of the cement and no more than about 30% by weight of the cement.

8. The composite cement slurry of claim 7, wherein the amount of the elastomeric material in the composite cement slurry is at least about 4% by weight of the cement and no more than about 10% by weight of the cement.

9. A method of treating a well drilled with a water-based drilling mud, the method comprising: pumping the composite cement slurry of claim 1 into at least one zone of the well following a water-based wellbore operation.

10. The method of claim 9, further comprising:
treating the at least one zone of the well by allowing the composite cement slurry to set and/or cure after the composite cement slurry was pumped into the at least one zone.

11. The method of claim 9, further comprising:
drilling the at least one zone of the well with the water-based drilling mud before pumping the composite cement slurry into the at least one zone.

12. The method of claim 9, further comprising:
at least partially filling a space between an outside of a metal casing disposed within the well and a borehole wall of the well with the composite cement slurry pumped into the at least one zone of the well.

13. A composite cement slurry comprising:
cement comprising at least one of cement particles or cementitious material;
water; and
water swellable particulates that are embedded in the cement at a concentration ranging from 0.1% to 40% by weight of the cement, the water swellable particulates comprising an elastomeric material doped with hydrophilic swellable polymer,
wherein a negative charge repulsion is associated with the elastomeric material and acts as a delay swelling mechanism for limiting swelling of the water swellable particulates during at least one of mixing or pumping of the composite cement slurry.

14. The composite cement slurry of claim 13, wherein the delay swelling mechanism is configured to allow the water swellable particulates to react with the water during thickening of the composite cement slurry but not during the mixing or the pumping of the composite cement slurry.

15. The composite cement slurry of claim 13, wherein the elastomeric material includes one or more polymers, and wherein the negative charge repulsion is associated with at least one polymer of the one or more polymers.

16. The composite cement slurry of claim 13, wherein the negative charge repulsion is attached to at least one functional group associated with the elastomeric material.

17. The composite cement slurry of claim 16, wherein the at least one functional group associated with the elastomeric material comprises at least one acrylate group.

18. The composite cement slurry of claim 13, wherein an amount of the elastomeric material in the composite cement slurry is at least about 2% by weight of the cement and no more than about 30% by weight of the cement.

19. The composite cement slurry of claim 13, wherein an amount of the elastomeric material in the composite cement slurry is at least about 4% by weight of the cement and no more than about 10% by weight of the cement.

* * * * *